United States Patent [19]

Hays

[11] 4,087,261
[45] May 2, 1978

[54] MULTI-PHASE SEPARATOR

[75] Inventor: Lance G. Hays, La Crescenta, Calif.

[73] Assignee: Biphase Engines, Inc., Santa Monica, Calif.

[21] Appl. No.: 718,950

[22] Filed: Aug. 30, 1976

[51] Int. Cl.² .................................................... B01D 1900
[52] U.S. Cl. .................................................... 55/41; 55/52; 55/176
[58] Field of Search .................... 60/649; 210/83, 84, 210/322, 354, 456, 512 R; 233/38, 40; 55/41, 52, 176

[56] References Cited

U.S. PATENT DOCUMENTS

| | | | |
|---|---|---|---|
| 2,422,464 | 6/1947 | Bartholomew | 210/512 R X |
| 2,967,618 | 1/1961 | Vane | 210/84 X |
| 3,271,929 | 9/1966 | Bowden et al. | 210/512 R X |
| 3,595,392 | 7/1971 | Markel | 210/84 X |
| 3,660,285 | 5/1972 | Markel | 210/84 X |
| 3,780,862 | 12/1973 | Mesing | 210/84 |
| 3,828,929 | 8/1974 | Hickey, Jr. | 210/84 X |
| 3,833,480 | 9/1974 | Bidard | 55/41 X |
| 3,879,949 | 4/1975 | Hays et al. | 60/649 |

Primary Examiner—Charles N. Hart
Assistant Examiner—Robert H. Spitzer
Attorney, Agent, or Firm—William W. Haefliger

[57] ABSTRACT

A method of separating multiple phases in a pressurized flow, and employing a nozzle and a rotor having a rotating surface, at least one of the phases being a liquid or solid, the method including the steps:

(a) passing the flow through the nozzle to expand the flow,
(b) receiving a portion of the flow on the rotor causing the rotor to rotate and said one liquid and/or solid phase to form a rotating liquid and/or solid ring urged toward said surface, and
(c) removing at least one of the phases from the rotor during rotation thereof.

The phases to be separated may include petroleum and natural gas components, brine and steam components, or high temperature combustion products.

2 Claims, 6 Drawing Figures 4,087,261

MULTI-PHASE SEPARATOR

BACKGROUND OF THE INVENTION

This invention relates generally to multi-phase separators, and more particularly concerns a simple and unusually advantageous method of separating multiple phases in a flow stream, and employing a rotary separator apparatus. As will be seen, it has particular application to separation of gas, liquid and solid particulates as found in production from oil and gas wells, and also geothermal wells and to separation of slag and fly ash particles from gaseous combustion products.

Prior techniques for separating oil, gas, water and sand produced from oil and gas wells have been time consuming, expensive and disadvantageous. Gravitational, inertial and/or capillary forces have been used with stationary surfaces resulting in large, bulky and inefficient structure. Moving surfaces (centrifuge) have been used but driven by expensive motors and requiring seals. Similarly, separation of brine and steam produced from geothermal wells has been inefficient to the extent that brine entrained in the steam produced plugging of stationary separators and rapid corrosion of steam turbine blades. Further, grit and sand particles entrained in the flow have tended to erode and wear expensive equipment such as turbines, valves, etc. Additionally a strong incentive exists to operate gas turbines or MHD generators directly from the product of coal combustion. Past attempts have been unsatisfactory because separation of the erosive and corrosive fly ash and slag from the hot gases has not been adequate. Accordingly, there is wide spread need for "on-line" type multi-phase separation techniques and apparatus characterized by simplicity and efficiency, and capable of direct connection in series with multi-phase production flow.

SUMMARY OF THE INVENTION

It is a major object of the invention to provide multi-phase separation methods and apparatus capable of overcoming the above described problems and disadvantages. Basically, the method employs a nozzle to receive the pressurized multi-phase flow, one of the phases being a liquid or solid, and a rotor, and includes the steps:

(a) passing the flow through the nozzle to expand the flow to a lower pressure and higher velocity, (b) receiving a portion of the flow on the rotor causing the rotor to rotate and said one liquid and/or solid phase to form a rotating liquid and/or solid ring urged toward said surface, and (c) removing at least one of the phases from the rotor during rotation thereof.

As will be seen, the input flow may consist of petroleum and natural gas components separating upon passage through the nozzle into gas (subject to collection) and a rotating ring of petroleum (which may separate into rings of water, oil and solid particulate); the separated and collected gas may be delivered to a gas line, and the liquid and solid rotating rings may be subjected to pick-up removal and subsequent use. In this regard, centrifugal pressurization of the rotating ring tends to drive entrained gas from the liquid ring. Similarly, in the case of a flow consisting of brine and steam passed through the nozzle, the non-contaminated steam is separated and collected for subsequent use (as for example feed to a steam turbine), and the brine is formed into a rotating ring which may be picked-up and removed, as will be described. The rotor is driven in rotation in response to impingement of the liquid and solid particulate, and provides a rotating surface on which the liquid and particulate rings form for centrifugal pressurization to remove entrained gas. A housing about the rotor forms a chamber in which the gas may be collected under pressure, for delivery to a line or a process or rotary apparatus such as a turbine. Further, the pick-up may be allowed to rotate and may be coupled to rotary apparatus to drive same, as will be seen; and the rotor may be coupled to driven apparatus. Similarly the input flow may consist of a mixture of combustion gas, fly ash and/or slag. A further object is to provide multiple interconnected separation stages, as will be described.

These and other objects and advantages of the invention, as well as the details of an illustrative embodiment, will be more fully understood from the following specification and drawings, in which:

DRAWING DESCRIPTION

DETAILED DESCRIPTION

Figure 1:
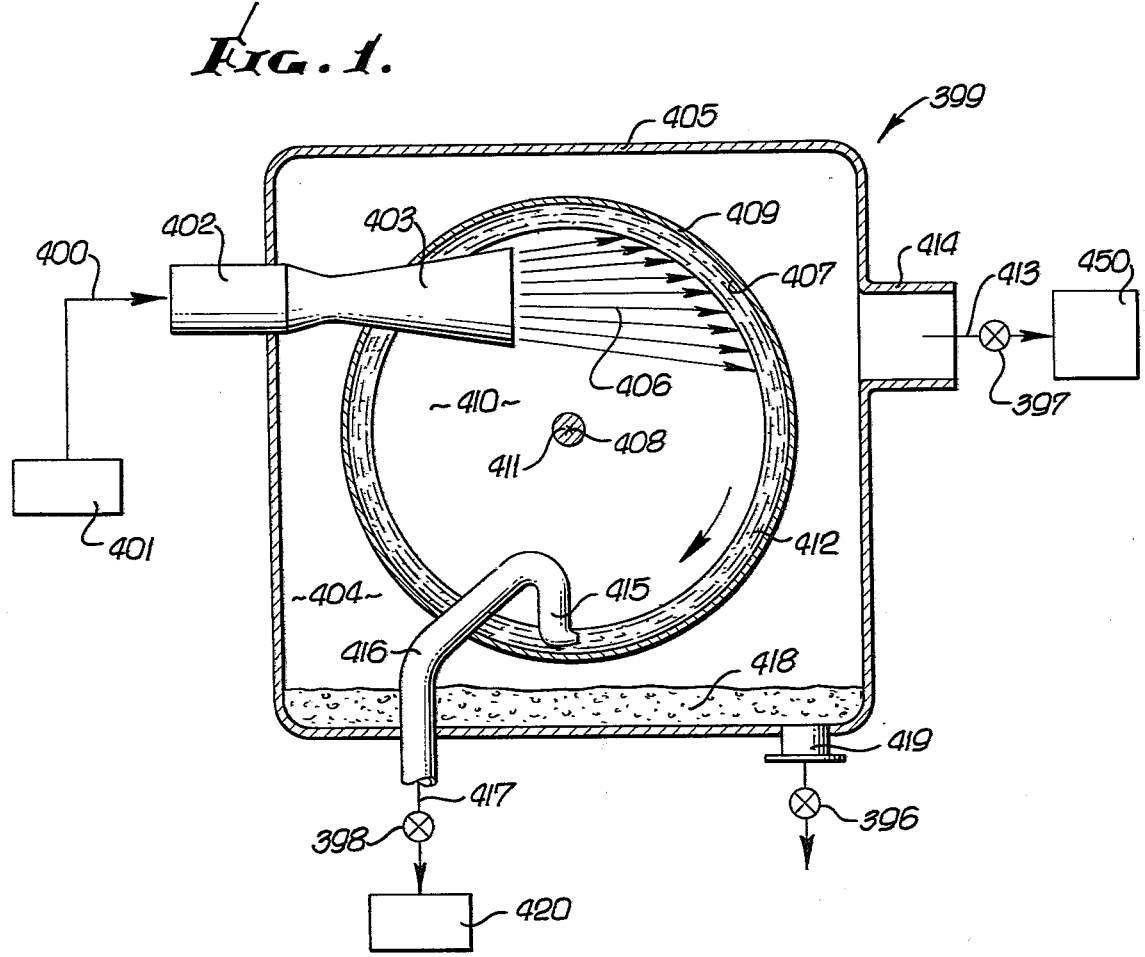
FIG. 1 is a side elevation showing a separator.

FIG. 1 shows inlet flow at 400 from a source 401 to separator apparatus 399. The pressurized flow typically includes two or more phases, such as gas and liquid, liquid and solid, gas and solid or the combination of gas, liquid and solid. The solid typically consists of particulate such as sand or fly ash for example. The flow may arise from naturally occurring multi-phase flows such as an oil, gas and water mixture from an oil or gas well; or brine, particulate and steam from a geothermal well. Other sources would include industrial processes where multi-phase flow occurs, such as combustion, producing fly ash particulate and gases, or slag and combustion gases.

The multi-phase mixture first flows through a mixer 402 serving to uniformly disperse the mixture across the cross section of the inlet to nozzle 403. The mixer or injector section may be of the type shown in FIGS. 9 and 9a of U.S. Pat. No. 3,879,949, or may comprise a commercially available mixer such as is used in chemical process industries.

Expansion of the flowing mixture occurs in nozzle 403, from a high pressure available at the well or process outlet to a lower pressure in the chamber 404 defined within casing or housing 405. The exiting mixture at 406 is characterized by a relatively high velocity, and is directed generally tangentially toward the moving or rotating peripheral surface at 407. That surface is presented inwardly toward axis 408, and may be defined by an annular flange 409, in a manner similar to that seen in FIGS. 5, 6, 7 and 7a of U.S. Pat. No. 3,879,949. Flange 409 on wheel 410 freely rotates on a shaft 411, under the force transmitted by the impinging flow, motive power being entirely or mainly supplied by the momentum in the mixture exiting from the nozzle. As a result of the centrifugal force field produced by rotation and by change of direction of the flow 406, a concentrated layer 412 of liquid and solid, fluidized solid or liquid alone, is formed on the surface 407. Gas or vapor is collected within the enclosed interior 404 and allowed to leave or discharge at 413 via casing outlet 414. The rotating ring shaped layer 412 is typically collected as by a pick-up or scoop 415 connected to discharge duct 416, and discharged at 417 for subsequent use. Any overflow of liquid and solid is collected at 418 at the bottom or sump portion of the casing interior, and discharged at port 419. Valves 397 and 398 may control the escape from outlets 414 and 417. Valve 396 controls discharge from 419.

The kinetic energy of the relatively moving layer 412 can be recovered as hydraulic power in the pickup 415, and used to cause or induce flow from the separator to the rest of the process (as for example is indicated at 420). For geothermal applications it may be used to reinject the brine. It can also be used to drive a hydraulic motor or otherwise to provide useful hydraulic power. The liquid pick-up 415 can also be allowed to rotate on a separate shaft as will be explained in FIG. 4, producing useful mechanical shaft power as a by-product of the separation process. Separated gas escaping at 413 can be used to drive rotary apparatus, as for example a steam turbine (indicated at 450) as in the case of production of steam and brine from a geothermal well at 401.

Figure 2:
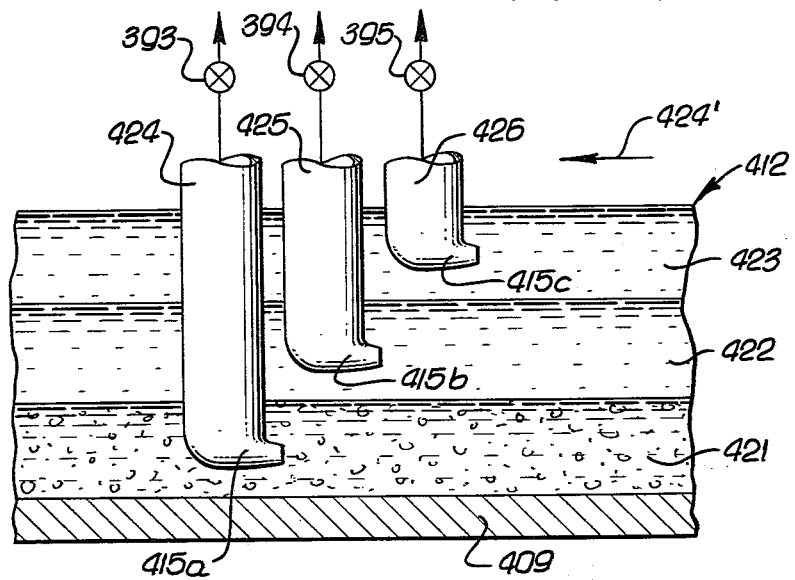
FIG. 2 is an enlarged elevation showing several discrete pick-ups.

The pick-up or scoop 415 may also comprise several discrete pick-ups as shown at 415a, 415b and 415c in FIG. 2. These may be of conventional tube type, streamlined, or may have relatively movable walls, etc. In this case, the flow from an oil well typically separates into a flowable solids-water mixture in layer 421, a nearly pure water layer 422, and a nearly pure oil layer 423. All layers travel relatively to the left, as indicated by arrow 424, and the layers are shown as linearly extended although in actuality they would have ring curvature. The pick-ups or scoops 415a–415c respectively project into layers 421–423, and face relatively upstream therein, and they are connected with discharge ducts 424–426 as shown. Duct 426 may lead to an oil pipeline. The pick-ups can be separate, or combined in one structure, or allowed to rotate relative to the layers to be picked up. The fluidized solids (particulate) which forms layer 421 may be naturally occurring, or can be produced by an auxiliary means of promoting the dispersion. In this regard, the source 401 may include a means to produce required pressurization of the flow, such as a pressurized gas feed, or a pump.

Figure 3:
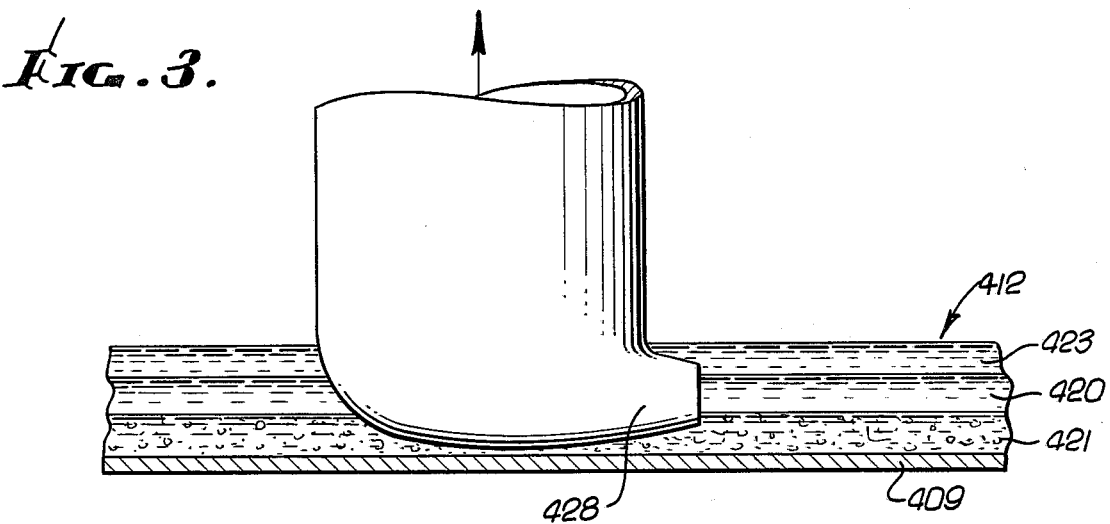
FIG. 3 is a view like FIG. 2, showing a single pick-up.

A single pick-up 418 may be employed as in FIG. 3 to separate one or more layers, with gas separating to discharge via outlet 413. Partial separation can be achieved if the pick-up or pick-ups do not fully penetrate the layer or layers.

Figure 4:
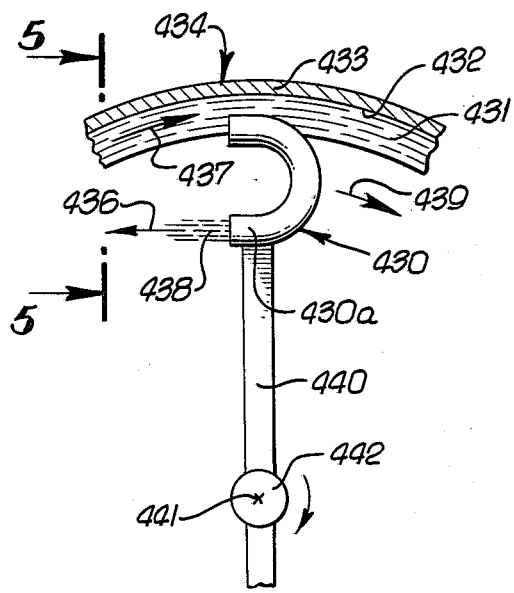
FIG. 4 is a side elevation showing a separator and impulse turbine.
Figure 5:
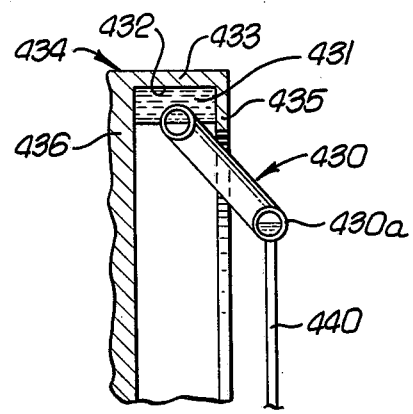
FIG. 5 is a view on lines 5—5 of FIG. 4.

Referring to FIGS. 4 and 5, a U-tube pick-up 430 is shown with its inlet projecting into the liquid ring-shaped layer 431 adjacent the annular surface 432 on flange 433 of rotary separator wheel 434. Surface 432 faces radially inwardly, and liquid is confined between rim wall 435 and wheel wall 436. Tube 430 projects at 430a axially outwardly from the wheel to discharge liquid at 438 reversely and in the direction of arrow 436, i.e. approximately 180° from the direction of arrow 437 indicating the direction of liquid flow in layer 431 adjacent the tube inlet. If collector 430 is allowed to rotate about the same axis 441 as the wheel, and at an absolute velocity of V/2 as indicated by arrow 439, then the velocity of the discharge flow at 438 is V/2 relative to the collector 430, but zero absolute. A strut 440 connects the collector 430 to an output shaft 442. Accordingly, useful work can be accomplished by the removal of the separated liquid from layer 431. Axis 441 may have any orientation, including horizontal or vertical.

Referring again to FIG. 2, note control valves 393, 394 and 395 in series with lines 424–426.

Figure 6:
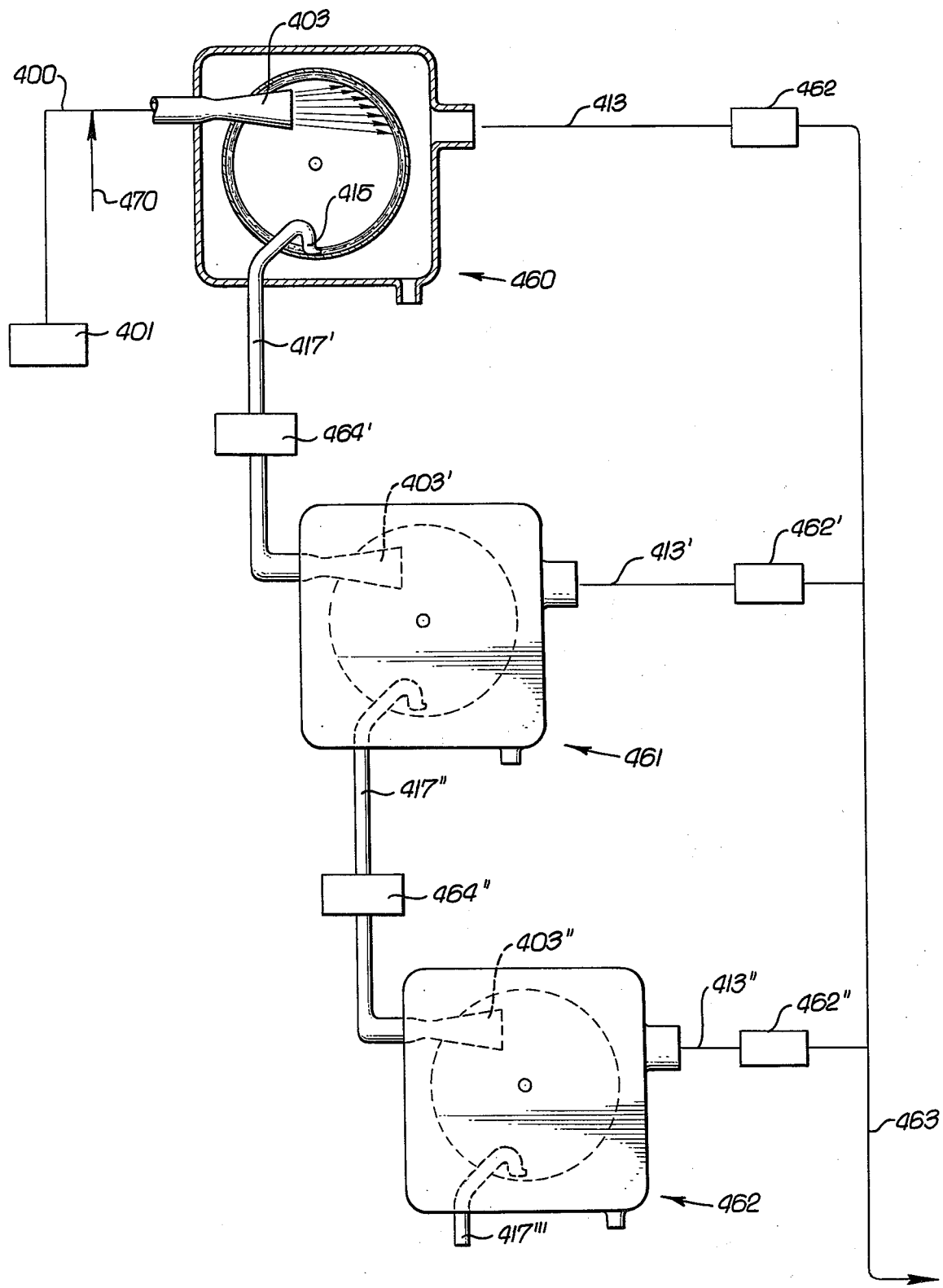
FIG. 6 is a schematic showing of a multiple stage system.

In FIG. 6, multiple stages 460, 461 and 462 are shown, each being like that described in FIG. 1 or FIG. 3, for example. The outlet 417' from the stage 460 is fed to the nozzle 403' of the next stage 461, and the outlet 417" from stage 461 is fed to the nozzle 403" of the next stage 462. Gas separated from the stages at 413, 413' and 413" may be suitably collected, as for example by blowers and/or valves 462, 462' and 462" discharging to a pipe line 463. In the case of a hot crude oil or other oil feed at 400, the system may be used to vaporize the high vapor pressure components which are separated in the rotary separators, whereby compact or relatively small size apparatus may be used to replace tall distillation columns. Pumps and/or valves may be used as at 464' and 464" in the lines 417' and 417" to control nozzle inlet pressures. Catalyst fluidized particles (as for example nickel or aluminum oxide pellets with platinum coating) may be added to the flow 400 to the two-phase nozzle 403, as indicated at 470. Liquids and catalysts are passed as at 417' and 417" to subsequent nozzles. Residual oil is collected at 417' or 417" or 417'". Stages 461 and 462 may be non-rotary, if desired.

In the drawings, the inlets as at 415, 428, and 415' may have "base vented" construction to lower skin friction drag by reducing total wetted area, as is known.

I claim:

1. In the method of separating multiple phases in a pressurized flow, and employing a nozzle and a rotor having a rotating surface, the phases including liquid petroleum and a gaseous component, the steps that include
   (a) passing the flow through the nozzle to expand the flow, causing the gaseous component to separate from the liquid petroleum,
   (b) receiving a portion of the flow on the rotor causing the rotor to rotate and said liquid petroleum to form a rotating ring urged toward said surface,
   (c) scooping liquid petroleum from the rotating ring on the rotor during rotation of the ring and rotor, and
   (d) confining the separated gaseous component in a zone within which the rotor rotates and removing the gaseous component from said zone,
   (e) there being a second nozzle and including the step of passing the removed liquid petroleum in the form of a second flow through said second nozzle to expand the second flow, causing a secondary gaseous component of the second flow to separate from the liquid petroleum,
   (f) there being a second rotor, and including the step of receiving a portion of the second flow on the second rotor causing the second rotor to rotate and said portion to form a second rotating ring urged toward a rotating surface of the second rotor,
   (g) scooping liquid petroleum from the rotating second ring, for removal, and
   (h) confining the separated secondary gaseous component in a secondary zone within which the second rotor rotates, and removing the secondary gaseous component from said zone.

2. The method of claim 1 wherein said phases include water which forms a separate rotating water ring on the first rotor, and including the step of scooping water from the rotating water ring independently of said scooping of petroleum from the rotating petroleum ring on said rotor.

* * * * *